United States Patent
Baughman et al.

(10) Patent No.: US 8,386,329 B1
(45) Date of Patent: Feb. 26, 2013

(54) SOCIAL NETWORK-BASED RECOMMENDATION

(75) Inventors: Aaron K. Baughman, Silver Spring, MD (US); Barry M. Graham, Silver Spring, MD (US); Rick A. Hamilton, II, Charlottesville, VA (US); Brian M. O'Connell, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/295,534

(22) Filed: Nov. 14, 2011

(51) Int. Cl.
    *G06Q 30/00* (2006.01)
(52) U.S. Cl. .................................................. 705/26.1
(58) Field of Classification Search ................. 705/26.1
    See application file for complete search history.

(56) References Cited

U.S. PATENT DOCUMENTS

| 7,680,770 | B1 | 3/2010 | Buyukkokten et al. |
| 2011/0179043 | A1* | 7/2011 | Lidstrom et al. ............... 707/748 |
| 2011/0282821 | A1* | 11/2011 | Levy et al. ..................... 706/47 |

FOREIGN PATENT DOCUMENTS

WO  2010048172 A1  4/2010

* cited by examiner

*Primary Examiner* — Mila Airapetian
(74) *Attorney, Agent, or Firm* — Douglas A. Lashmit; Hoffman Warnick LLC

(57) ABSTRACT

Embodiments of the invention provide methods and program products for making a recommendation to a purchaser and/or member of a social network. A first aspect of the invention provides a method of making a recommendation to a purchaser, the method comprising: determining a plurality of features of a first product selected by a purchaser; prioritizing the plurality of features of the first product; and making at least one recommendation to the purchaser, the at least one recommendation being selected from a group consisting of: a second product sharing at least one feature of the first product and a social network connection determined to have purchased another product sharing at least one feature of the first product.

16 Claims, 4 Drawing Sheets

SOCIAL NETWORK-BASED RECOMMENDATION

BACKGROUND

Embodiments of the invention provide methods and program products for making a recommendation to a purchaser and/or member of a social network.

Social networks provide a forum for individuals, typically connected by some sort of interdependency, to interact. Such interdependencies may include, for example, friendship, kinship, common interest(s), pursuit(s), or belief(s), financial exchange or relationship, etc. Some social networks include recommendation systems designed to compare characteristics of a member of the social network to reference characteristics and then predict a value for a recommendation to be made, i.e., a likelihood that the member would be interested in what is recommended. The recommendation may be almost anything in which the member may be interested, such as a product for purchase, an event the member might attend, an individual with whom the member might wish to connect or otherwise interact, etc.

Many such recommendation systems rely on something selected by the member (e.g., an item purchased) and then recommend to the member other selections made by other members of the social network who have also made the same selection as the member. These and other such recommendation systems consider a plurality of features or characteristics of the selected and unselected items together in calculating a value and determining which items will be recommended. Often, items most similar to those already selected by the member are then recommended to the member. As such, anomalous features or characteristic that may have great significance to a member may be overwhelmed by non-anomalous features, resulting in an item that would be of interest to the member not being included among those items recommended to the member.

SUMMARY

A first aspect of the invention provides a method of making a recommendation to a purchaser, the method comprising: determining a plurality of features of a first product selected by a purchaser; prioritizing the plurality of features of the first product; and making at least one recommendation to the purchaser, the at least one recommendation being selected from a group consisting of: a second product sharing at least one feature of the first product and a social network connection determined to have purchased another product sharing at least one feature of the first product.

A second aspect of the invention provides a method of making a recommendation to a member of a social network, the method comprising: determining a plurality of features of a product selected by a member of a social network; prioritizing the plurality of features, including: calculating at least one correlation value between at least one of the plurality of features and at least one feature of at least one additional product selected by another member of the social network; and ranking the calculated correlation values, wherein a relatively low correlation value is deemed indicative of an anomalous feature having significance and is given a higher priority than a relatively high correlation value; and making at least one recommendation to the member of the social network, the at least one recommendation being selected from a group consisting of: a product sharing at least one feature of the product selected by the member of the social network and a member of the social network that has selected a product sharing at least one feature of the product selected by the member of the social network.

A third aspect of the invention provides a program product stored on a computer-readable storage medium, which when executed, is operable to make a recommendation to a member of a social network by performing a method comprising: determining a plurality of features of a product selected by a member of a social network; prioritizing the plurality of features; and making at least one recommendation to the member of the social network, the at least one recommendation being selected from a group consisting of: a product sharing at least one feature of the product selected by the member of the social network and a member of the social network that has selected a product sharing at least one feature of the product selected by the member of the social network.

A fourth aspect of the invention provides a system comprising: at least one computing device configured for making a recommendation to a purchaser by performing a method comprising: determining a plurality of features of a first product selected by a purchaser; prioritizing the plurality of features of the first product; and making at least one recommendation to the purchaser, the at least one recommendation being selected from a group consisting of: a second product sharing at least one feature of the first product and a social network connection determined to have purchased another product sharing at least one feature of the first product.

The illustrative aspects of the present invention are designed to solve the problems herein described and other problems not discussed, which are discoverable by a skilled artisan.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Figure 1:
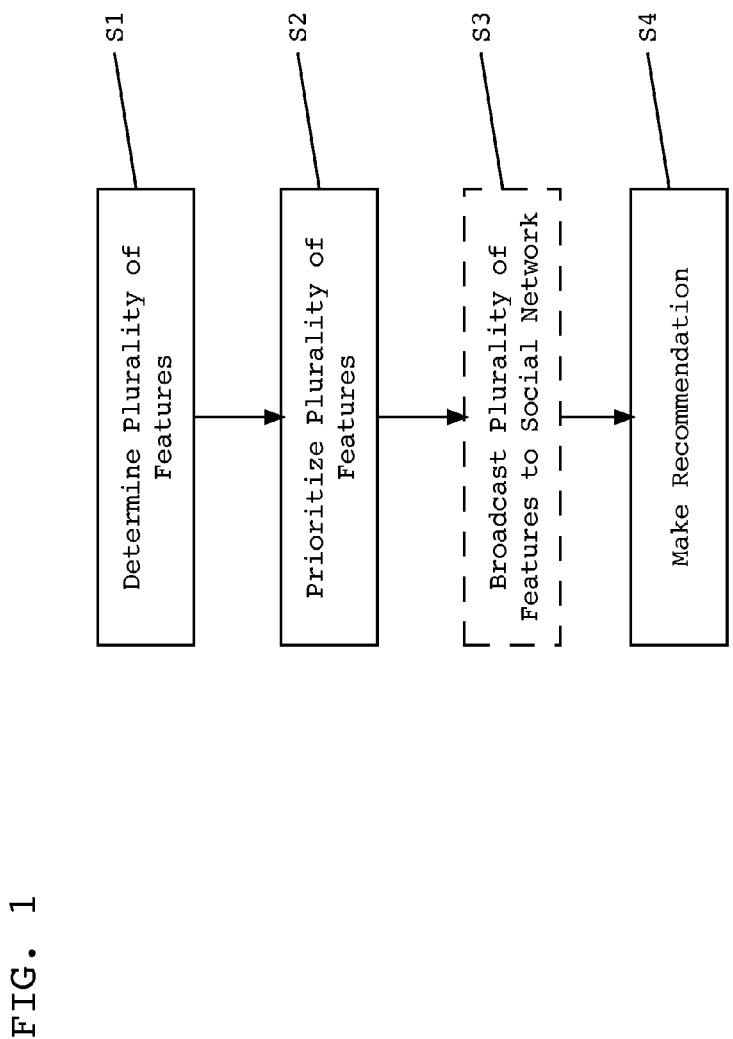
FIG. 1 shows a flow diagram of a method according to an embodiment of the invention.

Turning now to the drawings, FIG. 1 shows a flow diagram of a method according to an embodiment of the invention. At S1, once a purchaser and/or a member of a social network has selected an item, a plurality of features of that item are determined. The features determined will vary, of course, depending on the type of item selected, but may include, in addition to type-specific features, the brand or price of the item. With respect to type-specific features, using, merely for illustrative purposes, the case where the selected item is a book, the plurality of features may include, for example, the author, the publisher, the retailer, the genre, and/or the format (hardcover, softcover, e-book).

At S2, the plurality of features determined at S1 are prioritized. In some embodiments of the invention, prioritizing the features of an item may include detecting one or more anomalies in the features of a selected item. For example, in the context of making a valuable recommendation to a purchaser, it may be of greater significance that a feature of a selected item is dissimilar to the features of items previously selected by the purchaser. Thus, in some embodiments of the invention, prioritizing the features of an item may include comparing one or more features of the selected item to one or more features of a product or products previously purchased by the purchaser. Additional details of the prioritization and comparison at S2 are described below with reference to FIG. 2.

In some embodiments of the invention, the previously-purchased products may be limited to those purchased within a predetermined period. This may be useful, for example, where it is desirable to account for longer-term changes in a purchaser's buying habits. For example, as a purchaser's habits or tastes change, it may be necessary or desirable to restrict from the comparison items purchased in the more distant past, which may necessarily possess features dissimilar from those of more recently purchased items. That is, by restricting the comparison to purchases made within a predetermined period, the likelihood of spuriously detected anomalies is reduced.

In other embodiments of the invention, the previously-purchased products may include products purchased by members of the purchaser's social network with whom the purchaser is somehow connected. For example, it may be desirable or useful to compare features of a selected item to the features of items purchased by others known to have similar interests, beliefs, etc. Again, it may be useful to limit such comparisons to those products purchased within a predetermined period, as the habits and tastes of groups of purchasers may change just as those of an individual purchaser may change.

In making a comparison between one or more feature of a selected item and features of a previously-purchased item or items, some embodiments of the invention include the calculation of a correlation score or value. One skilled in the art will recognize that there are any number of correlation scores or values that may be calculated. One such correlation value is a Pearson's correlation value, typically expressed as r. Pearson's correlation values range from +1.0 to −1.0, representing, respectively, a perfect positive correlation and a perfect negative correlation. In the context of feature prioritization, and more particularly anomaly detection, a feature having a negative correlation may be of greater significance than a feature having a positive correlation. Similarly, weaker positive correlations are more indicative of anomalous features than are stronger positive correlations.

For example, continuing with the example above of a purchaser selecting a book, in comparing previous purchases of the same purchaser, if it is found that the format of the selected book is an electronic book (e-book) and previously-purchased books were in hardcover or softcover formats, the correlation value for this feature will likely be negative, indicating an anomaly. In terms of feature prioritization, this may be of great significance, as it may indicate that the purchaser has recently acquired an electronic book reader (e-reader) and therefore may be more likely to respond favorably to items recommended in this format.

At S3, the features of the selected item determined at S1 may optionally be broadcasted to a social network to which a purchaser belongs. In some embodiments of the invention, the plurality of features may be broadcasted after being prioritized at S2.

At S4, a recommendation is made to a purchaser and/or member of a social network. In some embodiments of the invention, the recommendation may include a product that shares at least one feature of the item selected by the purchaser/social network member. In other embodiments of the invention, the recommendation may include another member of the social network with whom the purchaser/social network member is not yet connected, but who has selected or purchased an item sharing at least one feature of the item selected by the purchaser/social network member. As described above, it may be desirable to recommend to the purchaser/social network member an item (or member of the social network) sharing a highly-ranked feature, such as a feature indicative of an anomalous selection by the purchaser/social network member.

Figure 2:
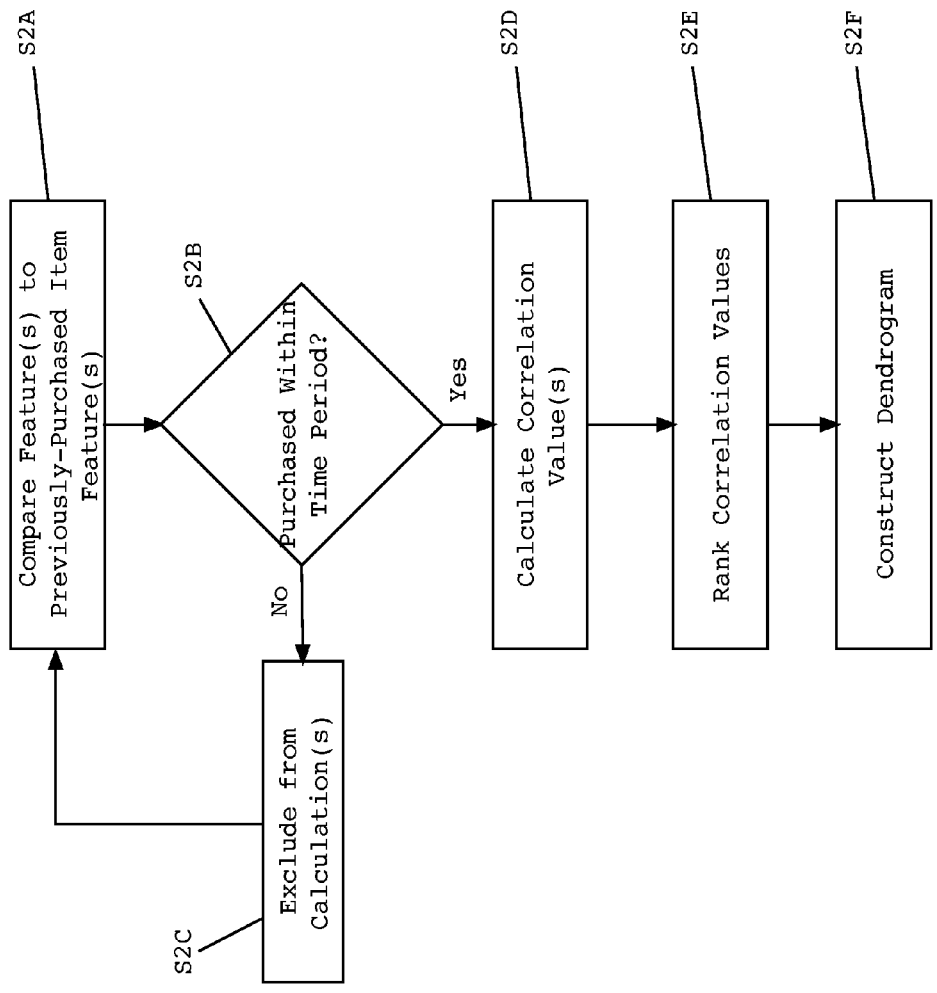
FIG. 2 shows a detailed flow diagram of a portion of FIG. 1.

FIG. 2 shows a flow diagram of the details of S2, according to some embodiments of the invention. As can be seen in FIG. 2, prioritizing the plurality of features may include a number of optional sub-steps. For example, at S2A, a comparison is made to previously-purchased items. As noted above, these may be items previously purchased by the purchaser/social network member, or they may be items previously purchased by other social network members with whom the purchaser/social network member is already affiliated.

At S2B, it may be determined whether the previously-purchased item was purchased within a predetermined period. If so (i.e., Yes at S2B), the previously-purchased item may be included in a correlation value calculated at S2D. If not (i.e., No at S2B), the previously-purchased item may be excluded from the correlation values (S2C), with flow iteratively looped to S2A for comparison to other previously-purchased items, if desired. In other embodiments of the invention, determining whether the previously-purchased item was purchased within a predetermined period may be performed before comparing its feature(s) to feature(s) of the selected item.

At S2E, the correlation values calculated at S2D may be ranked. As described above, it may be the case that a low positive or a negative correlation value may be of greater significance, in the context of making a recommendation to a purchaser/social network member, than would a high positive correlation value. That is, an anomalously selected item may indicated a change in a purchaser's buying habits or a social network member's interests or affiliations, the consequence of which may be a greater interest in items or people sharing features with that anomalously selected item.

At S2F, a dendrogram may be constructed to aid in making a recommendation to a purchaser/social network member at S3 (FIG. 1). Dendrograms are well known in the industry as a method of classifying or grouping items according to shared or similar characteristics. As such, the basics of their construction will not be described here. In the context of embodiments of the invention, however, it should be noted that dendrograms constructed at S2F may consider a single feature of a selected item at each level and include within that level only other items sharing that single feature.

Figure 3:
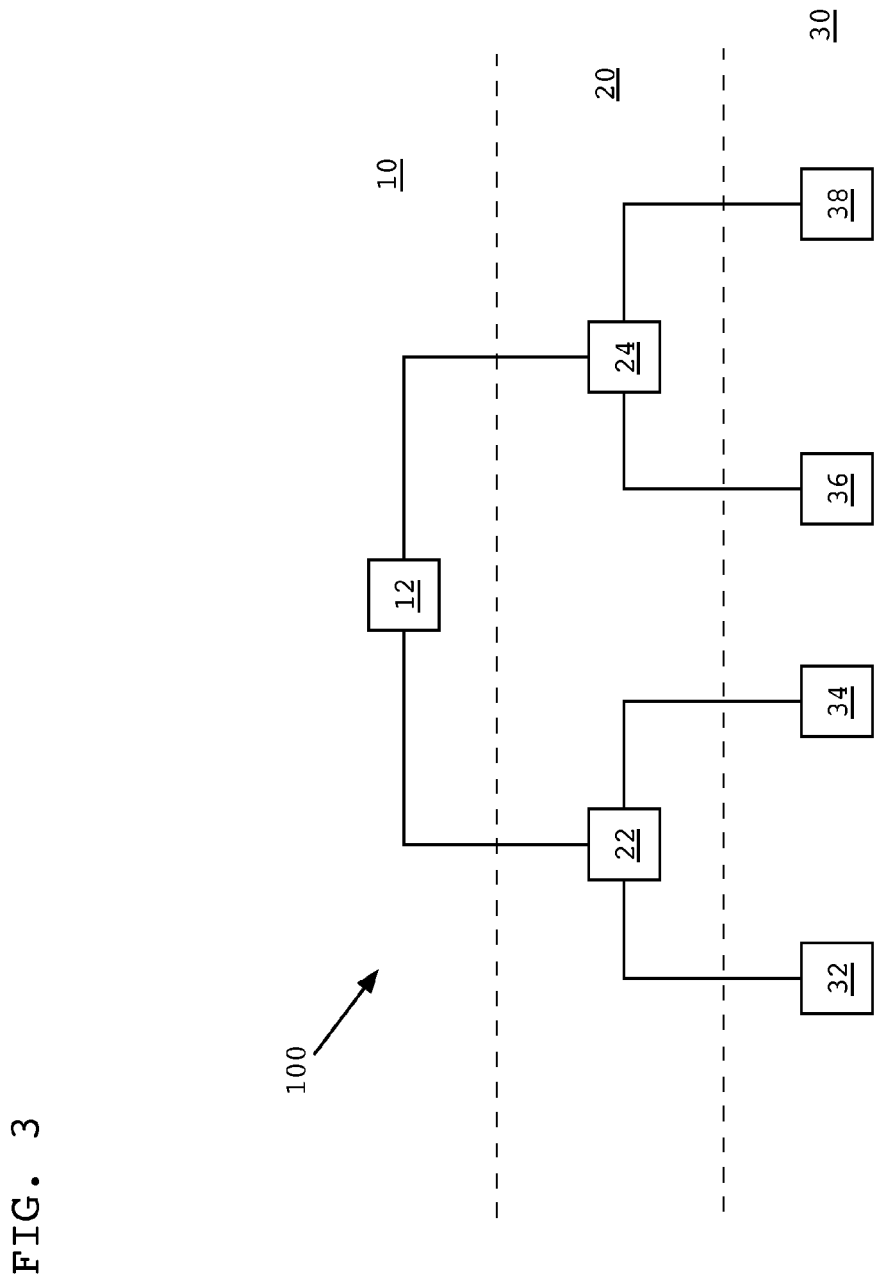
FIG. 3 shows a dendrogram constructed according to an embodiment of the invention.

For example, FIG. 3 shows an illustrative dendrogram 100 as may be constructed according to one embodiment of the invention. For the sake of brevity and ease of explanation, dendrogram 100 is shown in a very simple form. Actual dendrograms constructed according to embodiments of the invention may, in fact, be considerably more complex, as would be apparent to one skilled in the art.

Dendrogram 100 is shown having three levels: 10, 20, 30, each of which includes an item or items sharing a particular feature of a selected item. For example, level 10 includes a single item 12. Continuing with the example above of a purchaser selecting an e-book, it may be that the electronic format of the selected item is highly anomalous in the purchaser's buying history and is, therefore, the feature given the highest ranking at S2E (FIG. 2). Item 12 may, therefore, be another book by the same author in an electronic format.

Level 20 includes two items, 22 and 24. Again, continuing with the example above, it may have been determined that the authorship of the selected item is the second-highest ranked feature at S2E. That is, it may be that the author of the selected item represents an anomaly in the purchaser's buying history, although one not as anomalous as the electronic format of the selected item. As such, item 22 may represent a hardcover book by the same author and item 24 may represent a softcover book by the same author.

Level 30 includes four items, 32, 34, 36, and 38. Here, continuing with the example above, it may have been determined that the genre of the selected item is the third-highest ranked feature at S2E. That is, it may be that the genre of the selected item is a feature less anomalous than the electronic format and the author. As such, items 32 and 34 may represent a hardcover books by different authors within the same genre as the selected item and items 36 and 38 may represent softcover books by different authors within the same genre as the selected item.

Figure 4:
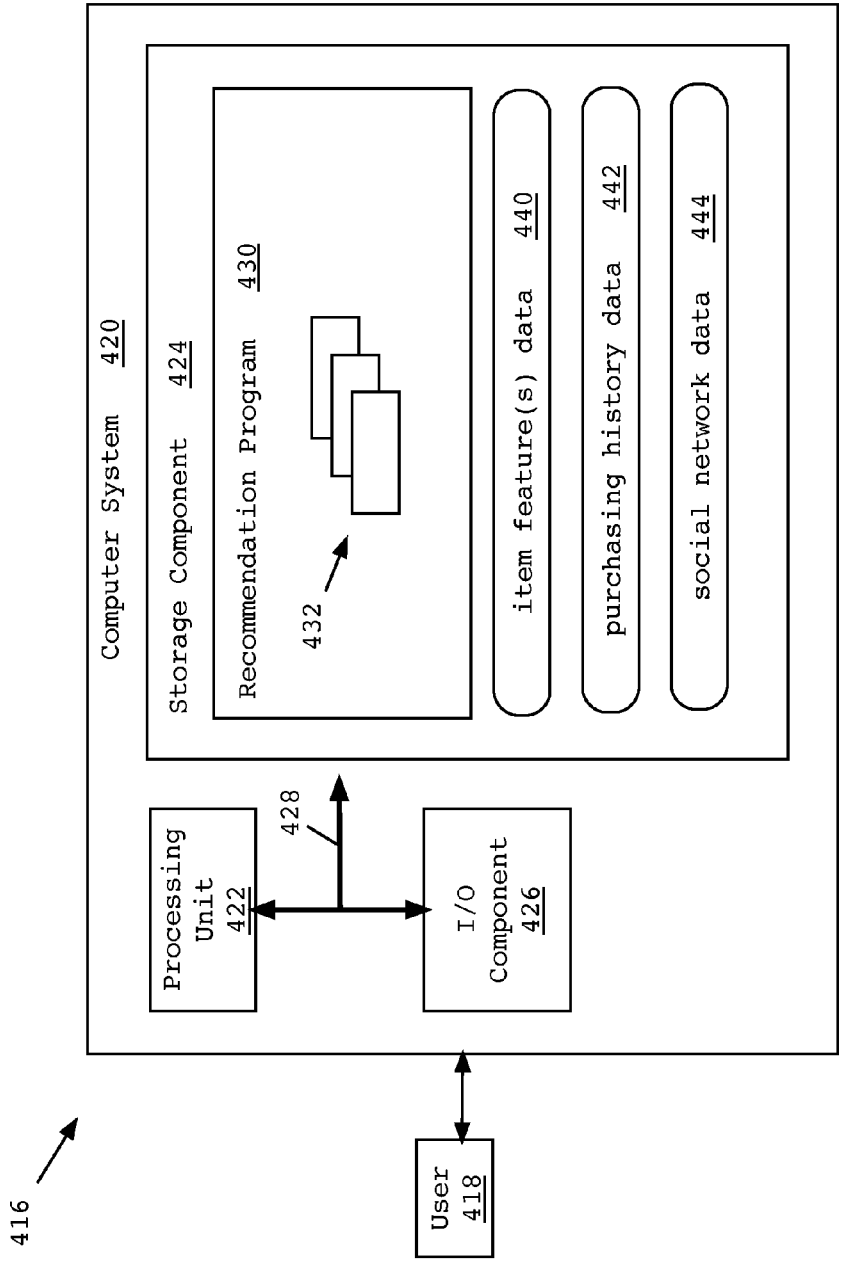
FIG. 4 shows a schematic of a system according to an embodiment of the invention.

FIG. 4 shows an illustrative environment 416 for making a recommendation to a purchaser/social network member. To this extent, environment 416 includes a computer system 420 that can perform a process described herein in order to make a recommendation to a purchaser/social network member. In particular, computer system 420 is shown including a recommendation program 430, which makes computer system 420 operable to make a recommendation to a purchaser/social network member by performing a process described herein.

Computer system 420 is shown including a processing component 422 (e.g., one or more processors), a storage component 424 (e.g., a storage hierarchy), an input/output (I/O) component 426 (e.g., one or more I/O interfaces and/or devices), and a communications pathway 428. In general, processing component 422 executes program code, such as recommendation program 430, which is at least partially fixed in storage component 424. While executing program code, processing component 422 can process data, which can result in reading and/or writing transformed data from/to storage component 424 and/or I/O component 426 for further processing. Pathway 428 provides a communications link between each of the components in computer system 420. I/O component 426 can comprise one or more human I/O devices, which enable a human user, such as user 418, to interact with computer system 420 and/or one or more communications devices to enable a system user (e.g., another computer system used to interact with user 418) to communicate with computer system 420 using any type of communications link. To this extent, recommendation program 430 can manage a set of interfaces (e.g., graphical user interface(s), application program interface, and/or the like) that enable human and/or system users to interact with recommendation program 430. Further, recommendation program 430 can manage (e.g., store, retrieve, create, manipulate, organize, present, etc.) the data, such as item feature(s) data 440, purchasing history data 442, and social network data 444 using any solution.

In any event, computer system 420 can comprise one or more general purpose computing articles of manufacture (e.g., computing devices) capable of executing program code, such as recommendation program 430, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, recommendation program 430 can be embodied as any combination of system software and/or application software.

Further, recommendation program 430 can be implemented using a set of modules 432. In this case, a module 432 can enable computer system 420 to perform a set of tasks used by recommendation program 430, and can be separately developed and/or implemented apart from other portions of recommendation program 430. As used herein, the term "component" means any configuration of hardware, with or without software, which implements the functionality described in conjunction therewith using any solution, while the term "module" means program code that enables a computer system 420 to implement the actions described in conjunction therewith using any solution. When fixed in a storage component 424 of a computer system 420 that includes a processing component 422, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 420.

When computer system 420 comprises multiple computing devices, each computing device can have only a portion of recommendation program 430 fixed thereon (e.g., one or more modules 432). However, it is understood that computer system 420 and recommendation program 430 are only representative of various possible equivalent computer systems that may perform a process described herein. To this extent, in other embodiments, the functionality provided by computer system 420 and recommendation program 430 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 420 includes multiple computing devices, the computing devices can communicate over any type of communications link. Further, while performing a process described herein, computer system 420 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, recommendation program 430 enables computer system 420 to make a recommendation to a purchaser/social network member. To this extent, computer system 420 can acquire and/or utilize information before, during, and after making a recommendation to a purchaser/social network member.

For example, computer system 420 can acquire and/or utilize item feature(s) data 440 corresponding to a selected item. The item feature(s) data 440 can comprise various information regarding a selected item.

Computer system 420 also can acquire and/or utilize purchasing history data 442, which can include various information regarding previously-purchased items. Similarly, computer system 420 also can acquire and/or utilize social network data 444, which can include information regarding individuals or groups within a social network, including those with whom a purchaser may be affiliated.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of making a recommendation to a purchaser, the method comprising:
   determining a plurality of features of a first product selected by a purchaser;
   prioritizing the plurality of features of the first product by:
      comparing at least one of the plurality of features to at least one feature of at least one previously-purchased product;
      calculating a correlation value for at least one of the compared features; and
      ranking the correlation values such that a relatively low correlation value is deemed indicative of an anomalous feature having purchasing significance and is given a higher priority than a relatively high correlation value; and
   making at least one recommendation to the purchaser, the at least one recommendation being selected from a group consisting of: a second product sharing at least one feature of the first product and a social network connection determined to have purchased another product sharing at least one feature of the first product.

2. The method of claim 1, further comprising:
   broadcasting the plurality of features of the first product to a social network.

3. The method of claim 1, wherein the previously-purchased product was purchased by a member of a social network other than the purchaser.

4. The method of claim 1, further comprising:
   constructing a dendrogram including a plurality of products for recommendation, wherein each of the plurality of products for recommendation shares at least one feature of the first product.

5. The method of claim 4, wherein constructing the dendrogram includes:
   including in a first level of the dendrogram a product that shares with the first product a feature having a highest ranked correlation value; and
   including in a second level of the dendrogram a product that shares with the first product a feature having a second-highest ranked correlation value.

6. The method of claim 1, further comprising:
   determining whether the at least one previously-purchased product was purchased within a predetermined period; and
   in the case that the at least one previously-purchased product was purchased within the predetermined period, including the at least one previously-purchased product when calculating the correlation value.

7. A method of making a recommendation to a member of a social network, the method comprising:
   determining a plurality of features of a product selected by a member of a social network;
   prioritizing the plurality of features, including:
      calculating at least one correlation value between at least one of the plurality of features and at least one feature of at least one additional product selected by another member of the social network; and
      ranking the calculated correlation values, wherein a relatively low correlation value is deemed indicative of an anomalous feature having significance and is given a higher priority than a relatively high correlation value; and
   making at least one recommendation to the member of the social network, the at least one recommendation being selected from a group consisting of: a product sharing at least one feature of the product selected by the member of the social network and a member of the social network that has selected a product sharing at least one feature of the product selected by the member of the social network.

8. The method of claim 7, wherein prioritizing the plurality of features includes constructing a dendrogram including the at least one of the plurality of features and the at least one feature of the at least one product selected by another member of the social network.

9. The method of claim 8, wherein constructing the dendrogram includes:
   including in a first level of the dendrogram at least one additional product that shares with the product selected by the member of the social network a feature having a highest ranked correlation value; and
   including in a second level of the dendrogram any additional product included in the first level that shares with the product selected by the member of the social network a feature having a second-highest ranked correlation value.

10. The method of claim 7, further comprising:
    determining whether the additional product was selected within a predetermined period; and
    in the case that the additional product was selected within the predetermined period, including the additional product when prioritizing the plurality of features.

11. The method of claim 7, further comprising:
broadcasting to the social network the plurality of features.

12. A program product stored on a computer-readable storage medium, which when executed, is operable to make a recommendation to a member of a social network by performing a method comprising:
determining a plurality of features of a product selected by a member of a social network;
prioritizing the plurality of features by:
comparing at least one of the plurality of features to at least one feature of at least one previously-purchased product;
calculating a correlation value for at least one of the compared features; and
ranking the correlation values such that a relatively low correlation value is deemed indicative of an anomalous feature having purchasing significance and is given a higher priority than a relatively high correlation value; and
making at least one recommendation to the member of the social network, the at least one recommendation being selected from a group consisting of: a product sharing at least one feature of the product selected by the member of the social network and a member of the social network that has selected a product sharing at least one feature of the product selected by the member of the social network.

13. The program product of claim 12, wherein prioritizing the plurality of features further includes:
constructing a dendrogram including the at least one of the plurality of features and the at least one feature of the at least one product selected by another member of the social network.

14. The program product of claim 13, wherein constructing the dendrogram includes:
including in a first level of the dendrogram at least one additional product that shares with the product selected by the member of the social network a feature having a highest ranked correlation value; and
including in a second level of the dendrogram any additional product included in the first level that shares with the product selected by the member of the social network a feature having a second-highest ranked correlation value.

15. The program product of claim 12, wherein the method further comprises:
determining whether the additional product was selected within a predetermined period; and
in the case that the additional product was selected within the predetermined period, including the additional product when prioritizing the plurality of features.

16. The program product of claim 12, wherein the method further comprises:
broadcasting to the social network the plurality of features.

* * * * *